United States Patent [19]

Christensen

[11] Patent Number: 5,178,459
[45] Date of Patent: Jan. 12, 1993

[54] TANK WITH A DOUBLE STIRRING SYSTEM, PRIMARILY A CURDLING TANK

[75] Inventor: Jens E. Christensen, Kolding, Denmark

[73] Assignee: Gadan Maskinfabrik A/S, Tenm, Denmark

[21] Appl. No.: 671,080

[22] Filed: Mar. 18, 1991

[30] Foreign Application Priority Data

Mar. 16, 1990 [DK] Denmark ................. 699/90

[51] Int. Cl.⁵ .................. A01J 15/06; A01J 25/00
[52] U.S. Cl. ............................ 366/291; 99/462; 99/466; 366/15; 366/66; 366/196; 366/297; 366/312
[58] Field of Search ............ 366/15, 64, 65, 66, 366/67, 184, 91, 94, 279, 290, 291, 292, 297, 301, 304, 309, 312, 315, 196; 99/348, 461, 462, 463, 466

[56] References Cited

U.S. PATENT DOCUMENTS

| 835,655 | 11/1906 | Aeschbach | 366/94 |
| 2,572,375 | 10/1951 | Oertli | 366/315 |
| 3,085,756 | 4/1963 | Danforth | 366/315 |
| 4,050,369 | 9/1977 | Mulvihill | 99/463 |
| 4,321,860 | 3/1982 | Hazen | 99/462 |
| 4,612,853 | 9/1986 | Kostiainen | 99/461 |

Primary Examiner—Harvey C. Hornsby
Assistant Examiner—Terrence R. Till
Attorney, Agent, or Firm—Antonelli, Terry, Stout & Kraus

[57] ABSTRACT

A curdling tank includes two upright, mutually intersecting, circular tank sections, each of the circular tank sections having a concentrically operated stirring system. The bottom portions of each of the circular tank sections are shaped to include sloping sides to form respective concentric bottom grooves with a downwardly pointed cross section, the lowermost portions of the grooves meet or overlap each other midway between the two shafts. The grooves are arranged in the shape of a figure of eight and the grooves achieve an effective emptying through a single outlet.

4 Claims, 1 Drawing Sheet

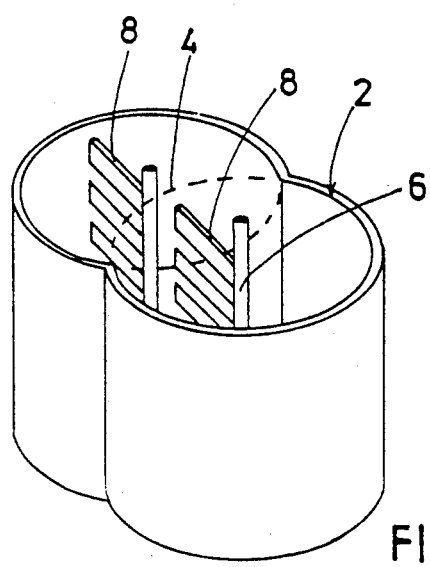
FIG. 1.
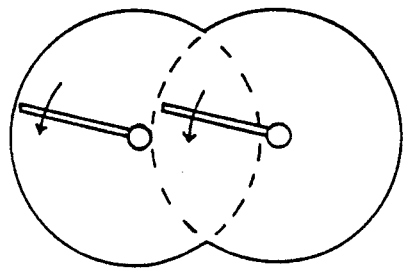
FIG. 2.
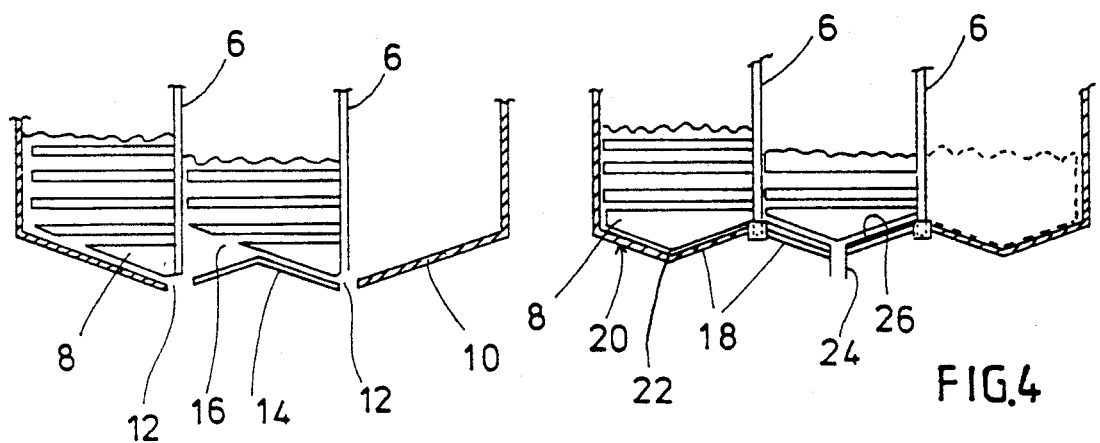
FIG. 3.
(PRIOR ART)
FIG. 4
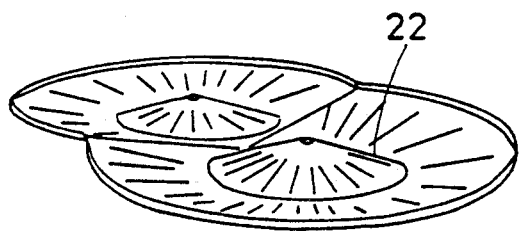
FIG. 5.
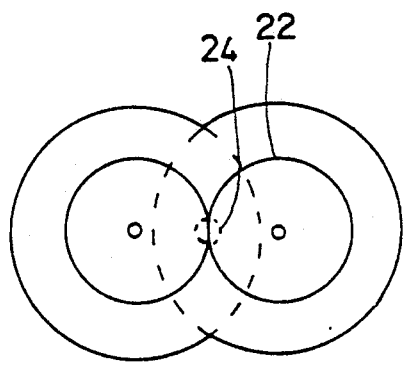
FIG. 6.

TANK WITH A DOUBLE STIRRING SYSTEM, PRIMARILY A CURDLING TANK

FIELD OF THE INVENTION

The present invention relates to a curdling tank or a corresponding tank of the type made as a vertically oriented container having two mutually intersecting, circular cylindrical container sections, in each of which there is mounted a stirring device, which is rotatable about a vertical axis and comprises at least one partly open stirring blade that is radially projecting from a driven shaft substantially entirely out to the wall of the respective container section over a substantial part of the height thereof and substantially all the way down to the bottom of the container, with the bottom being provided with closeable outlet means and with the two stirring systems operating in synchronism and such a mutual phase displacement between the stirring blades that these blades are alternately and freely movable through the container space portion that is common to both of the container sections, viz. in the overlapping area therebetween.

BACKGROUND OF THE INVENTION

It has been found that tanks of the aforementioned type, i.e. with a cross section as a figure of eight and with two simply rotating stirring devices, are highly suitable for a desirable treatment of the mass of cheese coagulum which is produced in the tank, suspended in whey, where it is important that the coagulum grains be kept uniformly suspended in the whey, as they will otherwise sink down and choke the outlet. By the end of their stay in the tank the grains are to be pumped out together with the whey for delivery to a further processing equipment, and it is desirable that this delivery can take place as an even flow, without occurance of any concentration of the grains towards the end of the outflow from the container, as it may otherwise be difficult to achieve an effective emptying of the container. Also for this reason it is important that the stirring devices operate quite closely to the bottom surface.

However, the final delivery from the bottom area raises problems. An effective final outflow is conditioned by the bottom areas beneath the stirring devices not being horizontally disposed, as they should slope downwardly towards the outlet, this most naturally being obtained by shaping the bottom areas conically, such that they form a downwardly narrowing well adjacent to each of the stirring shafts. The stirring blades may still operate immediately above the bottom surfaces, as they can be shaped with their lower edges extending outwardly and upwardly inclined corresponding to the bottom shape of the single container sections. Only it has to be accepted hereby that in the transition area between the two container sections a bottom elevation will occur. This elevation is a natural consequence of the intersection between the two conical bottom areas, and it makes no change in the fact that a very efficient final emptying of the two conical bottom areas is achievable. However, as known by the experts, the elevation results in the disadvantage that is required to make use of two mutually separated outlets from the tank, which can cause troubles, particularly towards the end of the emptying, where one bottom section may run dry before the other or even be found to be totally blocked by a compact mass of coagulum in the entire respective bottom area, thereby resulting in a considerable waste of coagulum.

It should be briefly mentioned that in curdling tanks not only a stirring is to be effected, but also, at an intermediate phase, a cutting function which is achieved, among things, by reversing the direction of rotation of the stirring devices, whereby a stirring grating is changed into a cutting grating operating to cut the coagulated milk mass into coagulum pieces that deliver whey from the cut surfaces and thereby shrink considerably, so as to form the said coagulum grains in the surrounding whey. Coagulum parts that are left uncut will instead be converted into a crumbled mass, which can subsequently be difficult to separate from the whey, and it is important, therefore, that the stirring and cutting blades or gratings reach as far as possible towards the side and bottom faces of the tank.

In this respect an entirely flat bottom is ideal, but such a bottom gives rise to special emptying problems, because a considerable tilting of the tank will be required for ensuring an efficient emptying through an outlet, and this is why other possibilities such as the first mentioned arrangement have been tried, though then with a required acceptance of other disadvantage.

SUMMARY OF THE INVENTION

The ideal solution would be a fixed tank having downwardly narrowing bottom areas, at which an outlet is provided only at a single place, and it is just this, —which is aimed at and achieved by the present invention. The invention is based on the consideration that a downwardly narrowing bottom configuration should not necessarily result in a single pointed structure, but instead and with almost the same effect in an annular groove, which, when horizontally disposed, can be provided with an outlet just somewhere along the length thereof; by the final emptying a small amount of material will then be able to collect along the bottom of the groove, but in a groove of pointed cross section this amount will be very small. In this manner it is possible to provide for a spacing between the outlet area and the respective middle points of the container sections, viz. such a considerable spacing that the two container sections can meet or overlap each other in the transition area, whereby an interjoined system of bottom grooves in the two sections may be obtained in a common level, and this entire system may very well be emptied through but a single outlet.

It will even amount to a constructional advantage that the outlet opening may thus be arranged spaced from the stirring shafts, as it will not then be necessary to provide for any combination of an outlet opening and a shaft bearing. Further advantages will be connected with the invention, as apparent form the following.

BRIEF DESCRIPTION

In the following the invention will be described in more detail with reference to the drawing, in which:

FIG. 1 is a perspective view of a tank which can represent both the prior art and the invention, FIG. 2 is a top view thereof, FIG. 3 is a side view of a known tank bottom, FIG. 4 is a corresponding view of the tank bottom according to an embodiment of the invention, FIG. 5 is a perspective view of the bottom area of a tank according to the invention, FIG. 6 is a schematic top view of such a bottom area.

DETAILED DESCRIPTION

FIGS. 1 and 2 show a tank 2 including two circular cylindrical tank sections that are built together in such a manner that they are open towards each other through a chord plane 4. There is mounted in each of the sections a stirring device comprising a central shaft 6 and a agitator and cutter blade 8, which project radially from the shaft 6, the blades 8 here being shown only schematically as a number of agitator wings. The blade 8 extends outwardly very close to the inside of the surrounding tank in each of the sections plate, and the tank sections are joined with mutual locations so that, during their rotation, each of the stirring blades will be moved past the opposite shaft 6 by a short distance therefrom. As illustrated, in FIG. 2, the stirring blade in one section may agitate the tank contents located immediately at the center line of the opposite section, where the agitation effect would otherwise be very low.

Usually, the two tank sections, a illustrated in FIG. 2, are shaped with downwardly pointed, conical bottom portions 10 in which, there are provided respective outlet openings 12 at the lower ends of the shaft; an elevation 14 in the meeting area between these two bottom portions will occur which necessitates the use of two mutually separated outlet openings 12, and as mentioned above this implies certain drawbacks.

It will be noted that the lower end of the stirring wing 8 has to be outwardly and upwardly inclined in such a manner that in order for the stirring wing 8 to sweep along bottom portion 10; additionally the stirring wing 8 it must have the outer portion of the lower edge 16 located at a height such that the wind has no possibility of being closely swept with respect to the bottom area adjacent to the lower end of the shaft 6 in the opposite tank section.

Moreover, it can be problematic to arrange a lower rotation bearing for the shaft 6 in the same area in which an outlet opening 12 should be provided.

According to the invention, the tank bottom is produced with a profilation as shown in FIG. 4. The areas between the shafts 6 and the respective outer tank sides are subdivided into an inner or central area 18, in which the bottom is conically upstanding, and an outer edge area 20, in which the bottom is inwardly and downwardly sloping, such that about each of the shafts 6 a circular, groove shaped bottom area 22 will be shaped midway between the center and the surrounding tank side plate. In the transition area between the two tank sections, these areas will be coinciding, as shown at 24 in FIG. 4, and when an outlet stub 26 is provided in or under this groove area it will be possible to drain off liquid and coagulum through this sole stub from the groove areas 22 in both of the opposed tank sections.

As shown in FIG. 4, the stirring blades 8 can be shaped such that their lower edges closely follow the contour of the associated bottom portions, whereby they will each, at their outer end, sweep closely past the opposite stirring shaft an important advantage over the system is obtained along the entire lower portion of the bottom portion according to FIG. 3. It is true that the stirring blade of each of the shafts extends entirely down to the lower end of the shaft, but in the vicinity of the shaft the stirring effect will be weak, so it is additionally important, therefore, that this area be periodically passed or swept by the outer end of the stirring blade of the opposite shaft. In the known tanks it can be a problem that the critical areas immediately above the outlet openings will have no efficient agitation, and it will be appreciated that this problem is eliminated by the invention.

In the illustrated tank according to the invention, the lower edge of the stirring blade of each shaft 6 will follow the bottom contour, in which the blade points directly against the opposite shaft, as illustrated in FIG. 4. The outer half of the lower edge of the blade extends outwardly and upwardly along the generator of the opposite bottom cone 18 which is directed towards the middle of the bottom. The lower edge portion during rotation does not extend down to the bottom in the sweeping areas located between the middle position and the places, where the two bottom sections meet with each other. Thus, each of the stirring blades in the areas will not sweep closely above the bottom portion of the opposite section, but there bottom portions are swept by their own associated stirring blade, and the areas are located substantially spaced from their associated shafts 6, such that the blades are here moved with a substantial speed and with resulting good agitation effect. Thus, it cannot be said that the problems have just been moved to somewhere else, where they would be just as difficult. The entire outflow area 22 is subjected to a quite efficient agitation.

By comparing FIGS. 3 and 4, it will be readily appreciated that the building height of the tank bottom will be substantially smaller in connection with the invention than according to FIG. 3.

Particularly from FIG. 5 it will be clear that the grooves 22 of both of the tank sections will exhibit a common area adjacent to the middle outlet 26. The groove system will be shaped as a figure eight, which is horizontally disposed, when the bottom is generally horizontally disposed. The groove system will be widely emptied even if the outlet is placed at some other place, for example, at one end of the system. Optionally, the bottom may be slightly downwardly inclined towards such a place, whereby the final emptying will be promoted, but even when the bottom is generally horizontal the emptying takes place quite effectively, and afterwards it is easy to clean the tank by flushing out the small amount of coagulum that is left in the groove system.

From a constructive point of view it is highly advantageous to provide fixed rotation bearings for the shafts 6 at the top portions of the respective central bottom cone portions, without this in any way influencing the outflow conditions, this being an important deviation from the tank according to FIG. 3.

With a chosen inclination of the bottom portions the shaping of the tank bottom will be accurately geometrically determined if based on the condition that the stirring blades shall sweep closely past the respective opposite stirring shafts 6, but if this condition is slackened, then the design may be modified, e.g. resulting in a broader width of the common groove system 24. The cone angles of the inner and outer bottom cones, respectively, should not necessarily be identical. A further possibility would be to combine more than two tank sections, as one or more sections could be added both lengthwise and crosswise.

It should be noted that that the new design of the tank bottom presents noticeable advantages also in such cases where two bottom outlets may be tolerated. Hereby, the opposed two groove systems should not necessarily communicate with each other.

I claim:

1. A tank in shape of a vertically oriented container comprising two mutually intersecting, circular container sections, each of said circular container sections including a stirring device having a vertical axis for rotation of the stirring device, a drive shaft, and at least one partly open stirring blade radially projecting from said driving shaft, said at least one partly open stirring blade extending from the drive shaft substantially to a wall of the respective circular container section, said at least one partly open stirring blade extending form substantially a top of each of the circular container sections and extending substantially to a bottom portion of the vertically oriented container, the bottom portion including closeable outlet means located at a lower area of one of the circular cylindrical container sections or between each of the circular cylindrical container sections, said bottom portion being downwardly inclined from said drive shaft towards said lower area, said lower area including a bottom of a ring shaped area around the drive shaft, the ring shaped area having a concentric groove, said concentric groove having a downwardly substantially pointed shape and a groove bottom, the bottom portion being downwardly sloping towards the groove bottom, said groove bottom having a diameter meeting another diameter of another groove bottom between the drive shaft of each of the circular container sections.

2. A tank according to claim 1, wherein the at least partly open stirring blade is mounted on the drive shaft, said at least partly open stirring blade being near to an opposite drive shaft of another circular cylindrical container, and wherein lower edges of the at least partly open stirring blade corresponds to the shape of the concentric groove such that an outer blade portion of the at least partly open stirring blade and a lower blade portion of the at least partially open stirring blade sweeping closely past a lowermost portion of the opposed shaft.

3. A tank according to claim 1, wherein the groove bottom has a radius equal to the half of the distance between the shaft of each container sections.

4. A tank according to claim 1, wherein the tank is a curdling tank.

* * * * *